(12) United States Patent
Tazume

(10) Patent No.: US 11,928,973 B2
(45) Date of Patent: Mar. 12, 2024

(54) PROCESSING SYSTEM, AERIAL VEHICLE CAPABLE OF FLYING UNMANNED, AND DUST CONDITION ESTIMATION METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 670 days.

(21) Appl. No.: 17/041,128

(22) PCT Filed: Oct. 8, 2019

(86) PCT No.: PCT/JP2019/039678
§ 371 (c)(1),
(2) Date: Sep. 24, 2020

(87) PCT Pub. No.: WO2021/070253
PCT Pub. Date: Apr. 15, 2021

(65) Prior Publication Data
US 2023/0108853 A1 Apr. 6, 2023

(51) Int. Cl.
*G08G 5/00* (2006.01)
*B64C 39/02* (2023.01)
*B64D 1/02* (2006.01)
*B64D 1/16* (2006.01)
*B64U 101/60* (2023.01)

(52) U.S. Cl.
CPC ......... *G08G 5/0069* (2013.01); *B64C 39/024* (2013.01); *B64D 1/02* (2013.01); *B64D 1/16* (2013.01); *G08G 5/0013* (2013.01); *G08G 5/003* (2013.01); *B64U 2101/60* (2023.01); *B64U 2201/10* (2023.01); *B64U 2201/20* (2023.01)

(58) Field of Classification Search
None
See application file for complete search history.

(56) References Cited

U.S. PATENT DOCUMENTS

| 9,483,951 | B1 | 11/2016 | McCusker |
| 10,071,804 | B1* | 9/2018 | Buchmueller ........ B64C 39/024 |
| 10,395,544 | B1 | 8/2019 | Harris et al. |
| 11,392,130 | B1* | 7/2022 | Desrosiers ............. G01C 21/20 |
| 2009/0138138 | A1* | 5/2009 | Ferren .................. G05D 1/0676 359/333 |

(Continued)

FOREIGN PATENT DOCUMENTS

| CN | 106976562 A | * | 7/2017 |
| JP | 2006-220445 A | | 8/2006 |

(Continued)

OTHER PUBLICATIONS

Translation of CN 106976562 (Year: 2017).*

(Continued)

*Primary Examiner* — Peter D Nolan
*Assistant Examiner* — Michael F Whalen
(74) *Attorney, Agent, or Firm* — Sughrue Mion, PLLC

(57) ABSTRACT

A flight system includes an aerial vehicle having a sensor and capable of flying unmanned. The flight system estimates a condition of dust in an area of a scheduled destination, on the basis of sensing data obtained by observing, with the sensor, the area from a flight position of the aerial vehicle. Then, the flight system controls the aerial vehicle on the basis of the estimation result.

11 Claims, 7 Drawing Sheets

(56) References Cited

U.S. PATENT DOCUMENTS

| | | | |
|---|---|---|---|
| 2014/0032034 A1 | 1/2014 | Raptopoulos et al. | |
| 2015/0360773 A1* | 12/2015 | Allen | B64C 23/072 416/131 |
| 2018/0059659 A1 | 3/2018 | Takeuchi et al. | |
| 2019/0047699 A1 | 2/2019 | Bonden et al. | |
| 2019/0103032 A1 | 4/2019 | Sasaki | |
| 2020/0065762 A1* | 2/2020 | Briggs | G08G 5/0026 |

FOREIGN PATENT DOCUMENTS

| | | |
|---|---|---|
| JP | 2015-26312 A | 2/2015 |
| JP | 2015-125760 A | 7/2015 |
| JP | 2018-191124 A | 11/2018 |
| JP | 2019-018589 A | 2/2019 |
| JP | 2019-067252 A | 4/2019 |
| WO | 2019089052 A1 | 5/2019 |

OTHER PUBLICATIONS

Concise English explanation of the relevance of JP2019018589A.
International Search Report of PCT/JP2019/039678 dated Dec. 3, 2019 [PCT/ISA/210].

* cited by examiner

FIG. 5

CONTROL INFORMATION EXAMPLE 1

| SAND DUST / ALTITUDE | LIGHT | MEDIUM | HEAVY |
|---|---|---|---|
| HIGH | REDUCE ALTITUD | WAIT | WAIT |
| MEDIUM | REDUCE ALTITUDE OR DROP ARTICLE | WAIT OR DROP ARTICLE | GAIN ALTITUDE |
| LOW | LAND | GAIN ALTITUDE OR DROP ARTICLE | GAIN ALTITUDE |

FIG. 6

CONTROL INFORMATION EXAMPLE 2

| SAND DUST / ALTITUDE | LIGHT | MEDIUM | HEAVY |
|---|---|---|---|
| HIGH | REDUCE ALTITUD | LOWER ARTICLE WITH REEL | WAIT |
| MEDIUM | REDUCE ALTITUDE OR LOWER ARTICLE WITH REEL | LOWER ARTICLE WITH REEL | GAIN ALTITUDE |
| LOW | LOWER ARTICLE WITH REEL | LOWER ARTICLE WITH REEL | GAIN ALTITUDE |

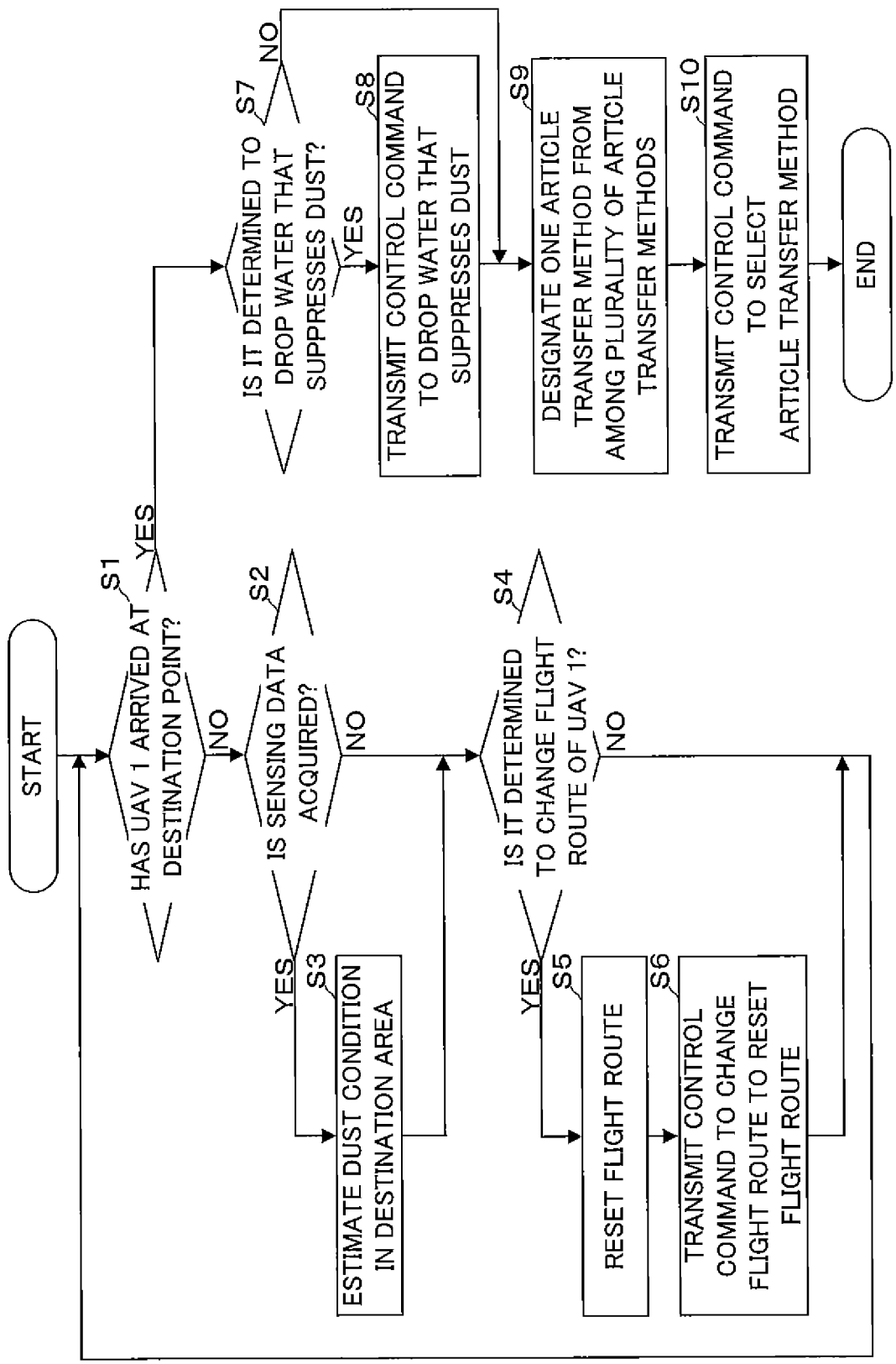

PROCESSING SYSTEM, AERIAL VEHICLE CAPABLE OF FLYING UNMANNED, AND DUST CONDITION ESTIMATION METHOD

CROSS REFERENCE TO RELATED APPLICATIONS

This application is a National Stage of International Application No. PCT/JP2019/039678, filed Oct. 8, 2019.

TECHNICAL FIELD

The present invention relates to a technical field of a system and the like including an aerial vehicle that includes a sensor and is capable of flying unmanned.

BACKGROUND ART

Conventionally, a dust amount in a periphery of an unmanned aerial vehicle can be acquired by a sensor included in the unmanned aerial vehicle. For example, Patent Literature 1 discloses a technology in which a peripheral dust amount acquired by a sensor installed in an unmanned aerial vehicle is evaluated per coordinates, and in a case where a peripheral environment of the unmanned aerial vehicle is changed into the one not suitable for flying, the unmanned aerial vehicle is moved to an appropriate position.

CITATION LIST

Patent Literature

Patent Literature 1: JP 2018-191124 A

SUMMARY OF INVENTION

Technical Problem

In related art of Patent Literature 1 or the like, a sensor can directly detect dust such as sand dust generated in a periphery of the unmanned aerial vehicle. However, in a case where a large amount of dust is generated in the periphery of the unmanned aerial vehicle during flight of the unmanned aerial vehicle, the unmanned aerial vehicle may be affected by the dust.

Therefore, one or more embodiments of the present invention have been made in view of the above circumstances, and are directed to providing a processing system, an aerial vehicle, and a dust condition estimation method which are capable of estimating a condition of dust before the aerial vehicle capable of flying unmanned is affected by the dust.

Solution to Problem

In response to the above issue, embodiments include a processing system including an aerial vehicle that includes a sensor and is capable of flying unmanned. The processing system includes: an acquisition unit configured to acquire sensing data obtained by observing, with the sensor, an area of a scheduled destination of the aerial vehicle from a flight position of the aerial vehicle; and a processing unit configured to estimate, on the basis of the sensing data, a condition of dust in the area of the scheduled destination. Consequently, it is possible to estimate the condition of dust before the aerial vehicle capable of flying unmanned is affected by the dust.

Embodiments also include a control unit configured to control the aerial vehicle on the basis of an estimation result by the processing unit. Consequently, it is possible to make the aerial vehicle capable of flying unmanned be hardly affected by the dust.

In some embodiments, the control unit changes, on the basis of the estimation result by the processing unit, a flight route of the aerial vehicle currently flying along a predetermined flight route. Consequently, it is possible to make the aerial vehicle capable of flying unmanned fly along the flight route hardly affected by the dust.

Some embodiments include a setting unit configured to reset, on the basis of an estimation result by the processing unit, a flight route of the aerial vehicle currently flying along a predetermined flight route. Consequently, it is possible to make the aerial vehicle capable of flying unmanned fly along the flight route hardly affected by the dust.

Some embodiments include a determination unit configured to determine, on the basis of an estimation result by the processing unit, whether or not to drop liquid that suppresses the dust in the area of the scheduled destination. Consequently, sand accumulated on the ground due to propulsive force generated by the aerial vehicle capable of flying unmanned can be prevented from becoming airborne as sand dust.

In some embodiments, the aerial vehicle transports an article to be transferred in the area of the scheduled destination, and the processing system further includes a first selection unit configured to select, on the basis of an estimation result by the processing unit, any one article transfer method from among a plurality of different article transfer methods. Consequently, it is possible to select an appropriate article transfer method in accordance with the estimated condition of dust.

In some embodiments, the first selection unit selects an article transfer method of making the aerial vehicle lower the article while making the aircraft hover for transferring the article. Consequently, sand accumulated on the ground due to propulsive force generated by the aerial vehicle capable of flying unmanned can be prevented from becoming airborne as sand dust.

In some embodiments, the first selection unit selects an article transfer method of making the aerial vehicle land for transferring the article.

In some embodiments, the aerial vehicle lands on the area of the scheduled destination, and the processing system further includes a second selection unit configured to select, on the basis of an estimation result by the processing unit, any one landing method from among a plurality of different landing methods. Consequently, it is possible to select an appropriate landing method in accordance with the estimated condition of dust.

In some embodiments, the processing unit estimates, on the basis of sensing data obtained by observing a ground in the area of the scheduled destination, a condition of dust that may be caused in future in the area of the scheduled destination. Consequently, it is possible to detect the condition of the sand accumulated on the ground, and detect the condition of dust that may be caused in the future.

In some embodiments, the processing unit estimates, on the basis of a condition of at least any one of dust and sand accumulated on the ground, a condition of dust that may become airborne in the future. Consequently, it is possible to estimate, from the condition of at least any one of the dust and the sand accumulated on the ground, the condition of dust that may be caused by the propulsive force generated by the aerial vehicle capable of flying unmanned.

Also provided herein is an aerial vehicle capable of flying unmanned. The aerial vehicle includes: a sensor; an acquisition unit configured to acquire sensing data obtained by observing, with the sensor, an area of a scheduled destination of the aerial vehicle from a flight position of the aerial vehicle; and a processing unit configured to estimate, on the basis of the sensing data, a condition of dust in the area of the scheduled destination.

Also provided herein is a dust condition estimation method performed by a processing system comprising an aerial vehicle that includes a sensor and is capable of flying unmanned. The dust condition estimation method includes: a step of acquiring sensing data obtained by observing, with the sensor, an area of a scheduled destination of the aerial vehicle from a flight position of the aerial vehicle; and a step of estimating, on the basis of the sensing data, a condition of dust in the area of the scheduled destination.

Advantageous Effect of the Invention

According to one or more embodiments of the present invention, it is possible to estimate the condition of dust before the aerial vehicle capable of flying unmanned is affected by the dust.

BRIEF DESCRIPTION OF THE DRAWINGS

FIG. 5 is a view illustrating examples of a control information set per combination of a dust condition and an altitude of an UAV 1.

FIG. 6 is a view illustrating examples of a control information set per combination of a dust condition and an altitude of an UAV 1.

FIG. 7 is a flowchart illustrating exemplary processing performed by a control unit 23 of a control server CS.

DESCRIPTION OF EMBODIMENTS

Hereinafter, an embodiment of the present invention will be described with reference to the drawings. Incidentally, the embodiment described below is an embodiment of a case where a present invention is applied to a flight system.

[1. Configuration and Outline of Operation of Flight System S]

Figure 1:
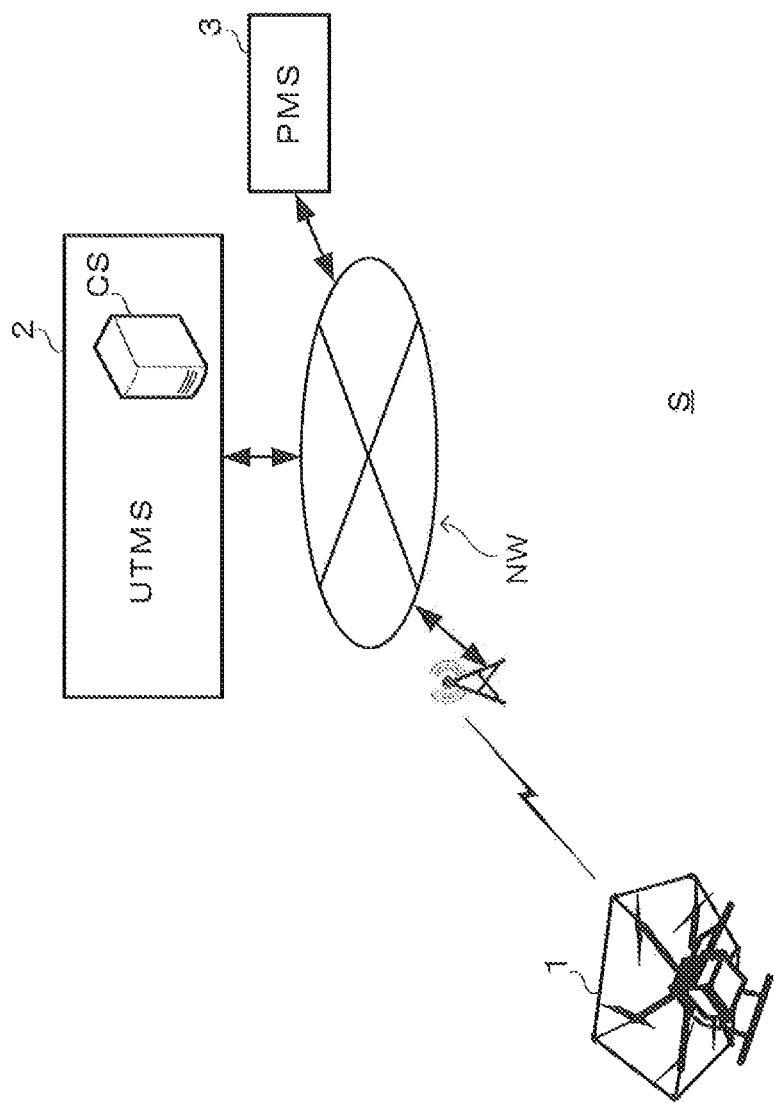
FIG. 1 is a diagram illustrating a schematic configuration example of a flight system S.

First, referring to FIG. 1, a description will be provided for a configuration and an outline of operation of a flight system S by which an aerial vehicle capable of flying unmanned is made to fly for a predetermined purpose. Examples of the predetermined purpose can include transportation, surveying, image capturing, inspection, monitoring, and the like. FIG. 1 is a diagram illustrating a schematic configuration example of the flight system S. As illustrated in FIG. 1, the flight system S (an example of a processing system) includes: an unmanned aerial vehicle (hereinafter referred to as an "UAV (Unmanned Aerial Vehicle)") 1 that flies in atmosphere (in air); a traffic management system (hereinafter referred to as a "UTMS (UAV Traffic Management System)") 2; and a port management system (hereinafter referred to as a "PMS (Port Management System)") 3. The UAV 1, the UTMS 2, and the PMS 3 can communicate with one another via a communication network NW. The communication network NW includes, for example, the Internet, a mobile communication network, a radio base station thereof, and the like. Incidentally, although one UAV 1 is shown in the example of FIG. 1, there may be a plurality of UAVs 1. The UTMS 2 and the PMS 3 may be configured as one management system.

The UAV 1 can fly in accordance with remote control from the ground by an operator or can fly autonomously. The UAV 1 is an example of an aerial vehicle capable of flying unmanned. The UAV 1 is also called a drone or a multicopter. The UAV 1 observes, with a sensor, an area of a scheduled destination (hereinafter referred to as a "destination area") from an own flight position during flight (hereinafter, observing is also referred to as sensing (remote sensing)). Sensing data obtained by this sensing is used in the flight system S to estimate a condition of dust in the destination area of the UAV 1. Here, the dust refers to airborne (floating) dust-like particles in the air. In the case where the particles are sand, the dust will be also referred to as sand dust (sandy dust). The UAV 1 is managed by a GCS (Ground Control Station). For example, the GCS is installed as an application in a control terminal that can be connected to the communication network NW. In this case, the operator is, for example, a person who operates the control terminal to remotely control the UAV 1. Alternatively, the GCS may be configured by a server or the like. In this case, the operator is, for example, a manager in the GCS or a controller provided in the server.

The UTMS 2 includes one or more servers including a control server CS. The UTMS 2 manages traffic and flight of the UAV 1. The traffic management of a UAV 1 includes management of a traffic plan of the UAV 1; management of a flight status of the UAV 1, and control of the UAV 1. The traffic plan of the UAV 1 is a flight plan including, for example, a flight route (scheduled route) from a departure point (flight start point) to a destination point (or a waypoint) for the UAV 1. The flight route is represented by, for example, latitude and longitude on the route, and may include flight altitude. The management and control of the flight status of the UAV 1 is performed on the basis of aircraft information of the UAV 1. The aircraft information of the UAV 1 includes at least position information of the UAV 1. The position information of the UAV 1 indicates the current position of the UAV 1. The current position of the UAV 1 is a flight position of the UAV 1 in flight. The aircraft information of the UAV 1 may include speed information of the UAV 1. The speed information of the UAV 1 indicates a flight speed of the UAV 1. The control of the UAV 1 includes a control based on the condition of dust estimated in the destination area of the UAV 1. Incidentally, the control of the UAV 1 may include air traffic control such as giving information and instructions to the UAV 1 in accordance with the flight status of the UAV 1.

The PMS 3 includes one or a plurality of servers and the like. The PMS 3 manages a takeoff and landing facility (hereinafter, referred to as "port"), for example, that is installed at the destination point (or the waypoint) in the destination area of the UAV 1. The port is managed on the basis of port position information, port reservation information, and the like. Here, the port position information indicates an installation position of the port. The port reservation information includes: an aircraft ID of the UAV 1 that has reserved the port; information on scheduled arrival time; and the like. The aircraft ID of the UAV 1 is identification information to identify the UAV 1. Incidentally, there may be a case where the UAV 1 lands at a point (hereinafter referred to as "temporary landing point") other than a prepared point like the port. Examples of such cases include: a case where the UAV 1 can hardly keep normal flight due to a sudden change (deterioration) of the weather in the airspace where the UAV 1 flies; a case where the UAV 1 delivers relief articles at the time of disaster; and the like. Generally, the temporary landing point for the UAV 1 is likely to have more sand dust than in prepared ports. [1-1. Configuration and Outline of Functions of UAV 1]

Figure 2:
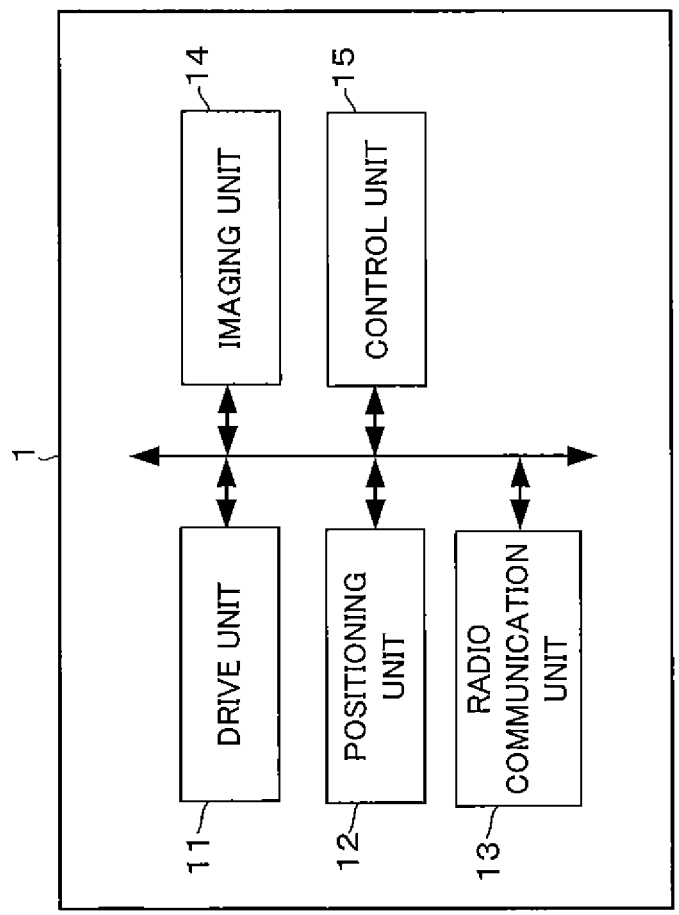
FIG. 2 is a diagram illustrating a schematic configuration example of an UAV 1.

Next, a configuration and an outline of functions of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a control unit 15, and the like. Incidentally, although not illustrated, the UAV 1 includes: rotors (propellers) that are horizontal rotary wings; various sensors; an article holding mechanism that holds an article to be transported; a water sprinkling mechanism to drop (sprinkle) water (an example of liquid) that suppresses dust; a battery that supplies power to respective units of the UAV 1; and the like. The rotors are the horizontal rotary wings and generate vertical propulsive force. The UAV 1 may be equipped with a parachute for emergency landing. Moreover, there may be a case where the UAV 1 includes fixed wings together with the rotors (for example, a case where a UAV is a drone of a VTOL (Vertical TakeOff and Landing) type. The various sensors used for flight control of the UAV 1 include a barometric sensor, a three-axis acceleration sensor, a geomagnetic sensor, a weather sensor, and the like. The weather sensor is used for monitoring weather conditions. Detection information detected by the various sensors is output to a control unit 15. The water sprinkling mechanism includes: a tank that stores the water; a sprinkler that drops the water; and the like. Incidentally, liquid other than the water may also be used to suppress the dust.

The drive unit 11 includes a motor, a rotating shaft, and the like. The drive unit 11 rotates the rotors with the motor, the rotating shaft, and the like that are driven in accordance with a control signal output from the control unit 15. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position (latitude and longitude) in a horizontal direction of the UAV 1 on the basis of the radio wave. Incidentally, the current position (horizontal position) in the horizontal direction of the UAV 1 may be corrected on the basis of an image captured by the imaging unit 14 or a radio wave sent from the radio base station. Further, the positioning unit 12 may detect the current position (altitude) in a vertical direction of the UAV 1 with the altitude sensor. The position information indicating the current position detected by the positioning unit 12 is output to the control unit 15.

The radio communication unit 13 controls communication performed via the communication network NW. The imaging unit 14 includes a camera (2D or 3D camera) and the like. The imaging unit 14 continuously captures images of a real space within a range included in an angle of view of the camera. The camera is used not only for flight control of the UAV 1 but also used as a sensor for sensing the destination area of the UAV 1. Here, the destination area is, for example, an area located distant from a current position of the UAV 1 in a travel direction by a certain distance or more. In a case where a flight route of the UAV 1 is set, the destination area is located on the flight route, and the UAV 1 is moved in the travel direction along with onward travel. It is desirable that the distance is, for example, equal to or longer than a distance at which the UAV 1 is affected by dust. Moreover, the distance may be changed depending on a dust condition in the destination area (for example, the more increased the dust is, the longer the distance is). Moreover, a wording "sensing the destination area" means observing (monitoring) at least any one of the air and the ground in the destination area of the UAV 1 from a viewpoint of the UAV 1, for example. The ground is not constantly flat and may have irregularities. As a sensor used for such sensing, not only an optical sensor such as a camera (for example, a sensor that detects visible rays or infrared rays reflected from an object) but also a microwave (radio wave) sensor or an ultrasonic sensor can be applied. Incidentally, sensing data obtained by the sensing is output to the control unit 15.

The control unit 15 includes a CPU (Central Processing Unit) which is a processor, a ROM (Read Only Memory), a RAM (Random Access Memory), a non-volatile memory, and the like. The control unit 15 performs sensing of the destination area by using the sensor such as the camera during the flight of the UAV 1 in accordance with a sensing program stored in the ROM or the non-volatile memory, for example. At this time, preferably, the control unit 15 continuously observes a range that can be detected by the sensor. Incidentally, during the flight of the UAV 1, the control unit 15 periodically transmits, to the UTMS 2, the aircraft information of the UAV 1 together with the aircraft ID of the UAV 1 via a radio communication unit 13. In a case where the sensing data is obtained by sensing the destination area, the control unit 15 transmits the sensing data to the control server CS via the radio communication unit 13 together with the aircraft ID and the aircraft information of the UAV 1.

Moreover, the control unit 15 executes various kinds of control for the UAV 1 in accordance with a control program stored in, for example, the ROM or the non-volatile memory. The various kinds of control include takeoff control, flight control, landing control, water sprinkling control, and article transfer control. In the flight control and the landing control, the position information acquired from a positioning unit 12, the image data acquired from an imaging unit 14, the detection information acquired from the various sensors, position information such as a destination point (a waypoint or a temporary landing point may also be used, and so forth), and the like are used to perform: rotor drive control; and control for a position, a posture, and the travel direction of the UAV 1. In such flight control, for example, flight plan information (indicating the flight route of the UAV 1, for example) acquired from the UTMS 2 may also be used. Incidentally, the autonomous flight of the UAV 1 is not limited to the autonomous flight performed under the flight control of the control unit 15 provided in the UAV 1, and the autonomous flight of the UAV 1 also includes, for example, autonomous flight performed by flight control as the entire flight system S.

Moreover, the landing control is also performed by a control command that is based on the condition of dust in the destination area and provided from, for example, the UTMS 2 or a GCS. For example, the control unit 15 (an example of a second selection unit) selects any one landing method from among a plurality of different landing methods in accordance with the control command based on the condition of dust in the destination area. Examples of the landing methods can include: (i) a method of making a UAV 1 gradually descend and land by the rotor drive control (normal landing method); (ii) a method of landing by stopping rotor driving and opening a parachute (only in a case where a UAV 1 is equipped with the parachute); and (iii) a method of landing by stopping the rotor driving and performing gliding with fixed wings (for example, gliding while circling around) (only in a case where a UAV 1 includes the fixed wings). On the other hand, the water sprinkling control is performed, for example, in the destination area in accordance with a control command that is based on the condition of dust in the destination area and provided from, for example, the UTMS 2 or the GCS. For example, the control unit 15 drops (sprinkles) the water that suppresses the dust in the destination area in response to the control command based on the condition of dust in the destination area.

In the article transfer control, for example, the article held by the article holding mechanism is transferred from a UAV 1 to a person or an UGV (Unmanned Ground Vehicle), for example, in the destination area and transferred (handed over) to another UAV 1 at a destination point. The article transfer control is also performed by a control command that is, for example, provided from the UTMS2 or the GCS and based on the condition of dust in the destination area. For example, the control unit 15 (an example of a first selection unit) selects any one article transfer method from among the plurality of different article transfer methods in accordance with the control command based on the condition of dust in the destination area. The examples of the article transfer method can include: (iv) a method of making the UAV 1 lower (bring down) an article with, for example, a reel, a winch, or the like in a hovering state for transferring the article; (v) a method of dropping an article (making the article fall) for transferring the article; and (vi) a method of making a UAV 1 land for transferring the article. According to the (iv) article transfer method, when the article reaches the ground or when the article reaches a height of several meters from the ground, the article is transferred by releasing the article. On the other hand, according to the (vi) article transfer method, the article is transferred by releasing the article after the UAV 1 has landed on the ground. Incidentally, the article may be released by automatically opening a hook that suspends the article (that is, in accordance with a control signal from the control unit 15) or by manually opening the hook that suspends the article (that is, by a person).

[1-2. Configuration and Outline of Functions of Control Server CS]

Figure 3:
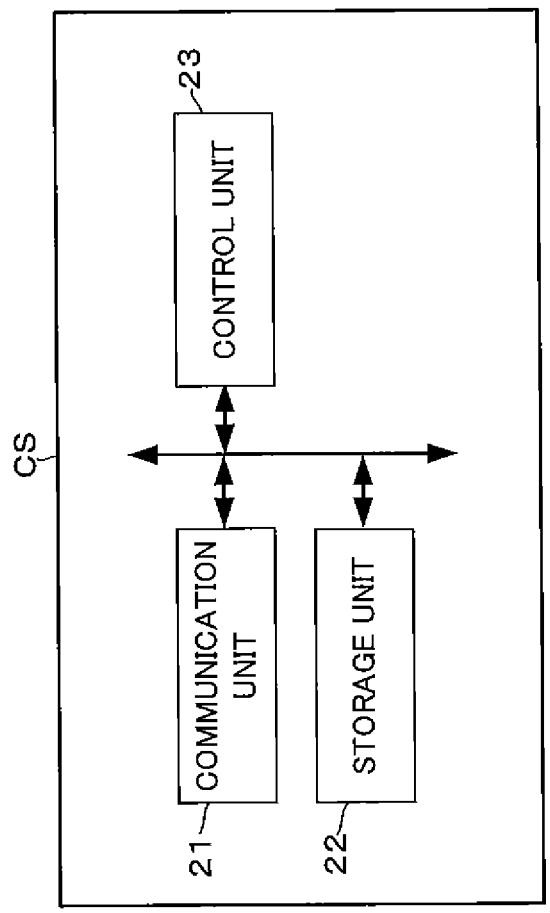
FIG. 3 is a diagram illustrating a schematic configuration example of a control server CS.
Figure 4:
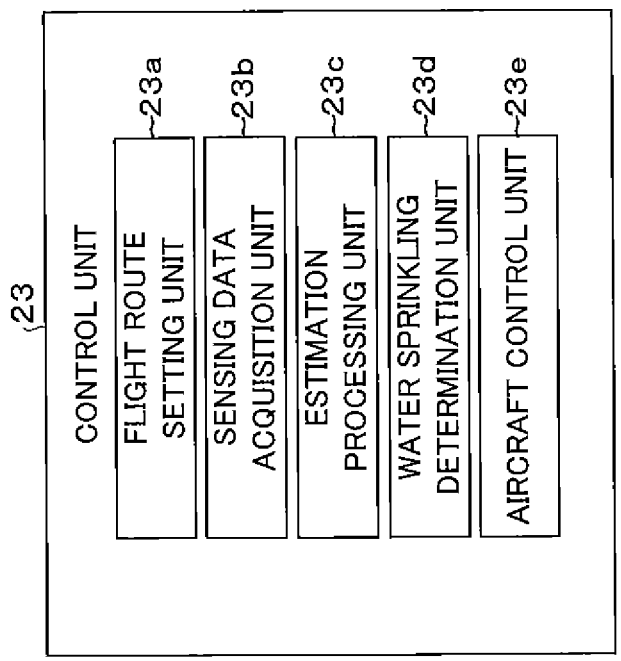
FIG. 4 is a diagram illustrating exemplary functional blocks in a control unit 23.

Next, a configuration and an outline of functions of the control server CS will be described with reference to FIGS. 3 and 4. FIG. 3 is a diagram illustrating a schematic configuration example of the control server CS. As illustrated in FIG. 3, the control server CS includes a communication unit 21, a storage unit 22, a control unit 23, and the like. The communication unit 21 controls communication performed via a communication network NW. The storage unit 22 includes, for example, a hard disk drive and the like. The storage unit 22 stores the aircraft ID of the UAV 1 and the aircraft information of the UAV 1 in a correlated manner.

The control unit 23 includes: a CPU that is a processor; a ROM; a RAM; a non-volatile memory; and the like. FIG. 4 is a diagram illustrating exemplary functional blocks in the control unit 23. As illustrated in FIG. 4, the control unit 23 functions as, for example, a flight route setting unit 23a, a sensing data acquisition unit 23b, an estimation processing unit 23c, a water sprinkling determination unit 23d, an aircraft control unit 23e, and the like in accordance with a program stored in the ROM or the non-volatile memory. Incidentally, the flight route setting unit 23a is an example of a setting unit. The sensing data acquisition unit 23b is an example of an acquisition unit. The estimation processing unit 23c is an example of a processing unit. The water sprinkling determination unit 23d is an example of a determination unit. The aircraft control unit 23e is an example of a control unit.

In a case where a flight plan application is made from the UAV 1 or the GCS, for example, the flight route setting unit 23a sets a flight route of the UAV 1 on the basis of the flight plan application. Moreover, the flight route setting unit 23a resets, on the basis of an estimation result by the estimation processing unit 23c, a flight route of the UAV 1 heading to a destination point along a predetermined flight route (for example, the above-described set flight route). For example, the flight route setting unit 23a resets, on the basis of the condition of dust in the destination area on the flight route of the UAV 1, a flight route that bypasses airspace having heavy dust. Incidentally, a flight route where an altitude is gained higher than that of the current flight route may also be reset.

During the flight of the UAV 1, the sensing data acquisition unit 23b acquires sensing data obtained by observing the destination area of the UAV 1 with the sensor from a flight position of the UAV 1, and the sensing data is acquired from, for example, the UAV 1 or the GCS together with the aircraft ID of the UAV 1. The sensing data includes, for example, image data representing a condition of at least any one of the air and the ground in an area of a scheduled destination.

The estimation processing unit 23c estimates the condition of dust in the destination area of the UAV 1 on the basis of the sensing data acquired by the sensing data acquisition unit 23b. That is, a dust amount is detected not by actually taking in the dust, but the dust condition is estimated from analysis on the sensing data (for example, image analysis). Here, examples of the condition of dust can include a dust degree (level), a dust amount, and the like. The dust degree is represented by, for example, stages like "heavy" (level: high), "medium" (level: medium), "light" (level: low) (may also be represented by numerical values, symbols, and the like). The dust amount is represented by the mass of the dust contained in 1 $m^3$, for example.

Moreover, the estimated condition of dust includes at least any one of a current dust condition and a future dust condition. The current dust condition refers to a dust condition at a timepoint (that is, a timepoint when the sensing data is obtained) when the UAV 1 is flying toward a destination point. For example, the estimation processing unit 23c estimates the dust degree as the current dust condition on the basis of color strength obtained from image data included in the sensing data (for example, the darker the color is, the heavier the dust is). Moreover, the estimation processing unit 23c estimates the dust amount as the current dust condition on the basis of: the color strength obtained from the above-described image data; and a model (for example, a learned model by machine learning) indicating a relation between the color strength and the mass of dust.

On the other hand, the future dust condition refers to a dust condition at a timepoint after a predetermined period (for example, 5 to 10 minutes later) from a timepoint when the UAV 1 is flying toward the destination point. The timepoint after the predetermined period is, for example, scheduled time when the UAV 1 arrives at the destination point. For example, the estimation processing unit 23*c* estimates a dust condition that may be caused in the future by predicting, from the current dust condition, a dust condition after the predetermined period (for example, 5 to 10 minutes). The dust condition after the predetermined period is, preferably, predicted from the current dust condition on the basis of, for example, weather forecast (e.g., weather, a wind direction, and the like) after the predetermined period.

Moreover, the estimation processing unit 23*c* may identify a condition of sand (e.g., an amount or a degree of the sand) accumulated on the ground, on the basis of sensing data obtained by observing the ground in the destination area (e.g., the ground in the vicinity of the destination point), and estimate a condition of sand dust that may become airborne in the future from the identified sand condition. For example, a condition in that the more the amount of accumulated sand is, the heavier the sand dust will be in the future is estimated. The reason is that the more the amount of the sand accumulated on the ground is, the more increased an amount of airborne sand dust caused by the wind generated by propulsive force is when the UAV 1 descends.

The water sprinkling determination unit 23*d* determines, on the basis of the estimation result by the estimation processing unit 23*c*, whether or not to drop the water that suppresses the dust in the destination area of the UAV 1. For example, in a case where the future dust condition is estimated to be heavy dust by the estimation processing unit 23*c*, the water sprinkling determination unit 23*d* determines to drop the water.

The aircraft control unit 23*e* controls the UAV 1 in flight on the basis of the estimation result by the estimation processing unit 23*c*. Such control is performed by, for example, transmitting, to the UAV 1 or the GCS that manages the UAV 1, a control command based on the condition of dust in the destination area. For example, the aircraft control unit 23*e* performs, on the basis of the estimation result by the estimation processing unit 23*c*, flight control, water sprinkling control, landing method selection control, or article transfer method selection control for the UAV 1 in flight.

For example, in the flight control, in a case where the flight route is reset by the flight route setting unit 23*a* on the basis of the estimation result by the estimation processing unit 23*c*, the aircraft control unit 23*e* changes the flight route of the UAV 1 currently flying along the predetermined flight route. Consequently, the UAV 1 can be made to fly along the flight route hardly affected by the dust. Incidentally, even in a case where the flight route is not reset by the flight route setting unit 23*a*, the aircraft control unit 23*e* may change the flight route of the UAV 1 currently flying along the predetermined flight route in a case where the current dust condition is estimated to be heavy dust by the estimation processing unit 23*c*.

Moreover, in the water sprinkling control, in a case where the water sprinkling determination unit 23*d* determines to drop the water, the aircraft control unit 23*e* controls the UAV 1 to drop the water. Moreover, in the landing method selection control, the aircraft control unit 23*e* selects any one landing method from among the plurality of different landing methods on the basis of the estimation result by the estimation processing unit 23*c*. Consequently, an appropriate landing method can be selected in accordance with the estimated condition of dust. For example, in a case where the future dust condition is estimated to be heavy dust by the estimation processing unit 23*c*, the aircraft control unit 23*e* selects the (ii) or (iii) landing method described above.

Moreover, in the article transfer method selection control, the aircraft control unit 23*e* selects any one article transfer method from among the plurality of different article transfer methods on the basis of the estimation result by the estimation processing unit 23*c*. Consequently, it possible to select an appropriate article transfer method in accordance with the estimated condition of dust. For example, in a case where the current dust condition is estimated to be heavy dust by the estimation processing unit 23*c*, the aircraft control unit 23*e* selects the (iv) or (v) article transfer method described above.

Incidentally, the aircraft control unit 23*e* may also control a hovering UAV 1 on the basis of: a dust condition estimated by the estimation processing unit 23*c*; and an altitude of the UAV 1 hovering in the destination area. In this case, control information preset per combination of a dust condition and an altitude of the UAV 1 is used. FIGS. 5 and 6 are views illustrating examples of the control information set per combination of a dust condition and an altitude of the UAV 1. Incidentally, in the examples of FIGS. 5 and 6, the dust condition (dust degree) are classified into three stages of "heavy", "medium", and "light", and the altitude of UAV 1 is classified into three stages of "high" (e.g., 100 m or higher), "medium", and "low" (e.g., lower than 50 m), but may also be classified into two stages, or four or more stages.

In the example of FIG. 5, in a case where the dust is estimated as "MEDIUM" by the estimation processing unit 23*c* and the altitude of the UAV 1 at the time is determined as "MEDIUM", the aircraft control unit 23*e* makes, in accordance with control information 1 illustrated in FIG. 5, the UAV 1 wait (wait at the same altitude) in a hovering state or makes the UAV 1 drop an article. Moreover, in a case where the dust is estimated as "LIGHT" by the estimation processing unit 23*c* and the altitude of the UAV 1 at the time is determined as "HIGH", the aircraft control unit 23*e* makes the UAV 1 descend in accordance with control information 1 illustrated in FIG. 5. Then, in a case where the dust at the time is estimated to be still "LIGHT" although the altitude of the UAV 1 has become "MEDIUM" by making the UAV 1 descend, the aircraft control unit 23*e* makes the UAV 1 further descend or drops the article from the UAV 1. On the other hand, in a case where the dust at the time is estimated to be still "LIGHT" although the altitude of UAV 1 has become "LOW" by making the UAV 1 descend, the aircraft control unit 23*e* makes the UAV 1 land.

On the other hand, in the example of FIG. 6, in a case where the dust is estimated as "MEDIUM" by the estimation processing unit 23*c* and the altitude of the UAV 1 at the time is determined as "MEDIUM", the aircraft control unit 23*e* makes the UAV 1 lower the article with the reel in the hovering state in accordance with control information 2 illustrated in FIG. 6. Moreover, in a case where the dust is estimated as "HEAVY" by the estimation processing unit 23*c* and the altitude of the UAV 1 at the time is determined as "LOW", the aircraft control unit 23*e* makes the UAV 1 ascend in accordance with the control information 2 illustrated in FIG. 6. Then, in a case where the dust at the time is estimated to be still "HEAVY" although the altitude of the UAV 1 has become "MEDIUM" by making the UAV 1 ascend, the aircraft control unit 23*e* makes the UAV 1 further ascend. On the other hand, in a case where the altitude of the UAV 1 becomes "MEDIUM" by making the UAV 1 ascend and the dust at the time is decreased and estimated as "MEDIUM", the aircraft control unit 23*e* makes the UAV 1 lower the article with the reel in the hovering state.

[2. Operation of Flight System S]

Next, operation of the flight system S will be described with reference to FIG. 7. FIG. 7 is a flowchart illustrating exemplary processing performed by the control unit 23 of the control server CS. Incidentally, assume that aerial vehicle information of a UAV 1 to be controlled is periodically received in the control server CS.

The processing illustrated in FIG. 7 is started after the UAV 1 to be controlled starts flying. When the processing illustrated in FIG. 7 is started, the control unit 23 determines whether or not the UAV 1 currently flying along a predetermined flight route has arrived at the destination point (step S1). The determination on arrival at the destination point is performed by determining whether or not a current position of the UAV 1 enters a vicinity range (e.g., several meters) of the destination point on the basis of, for example, position information of the UAV 1 and position information of the destination point. In a case where the control unit 23 determines that the UAV 1 has not arrived at the destination point (step S1: NO), the processing proceeds to step S2.

In step S2, the control unit 23 determines whether or not sensing data obtained by the UAV 1 observing the destination area (that is, sensing from a flight position away from the destination area) is acquired via the communication unit 21. In a case where the control unit 23 determines that the sensing data is acquired (step S2: YES), the processing proceeds to step S3. On the other hand, in a case where the control unit 23 determines that the sensing data is not acquired (step S2: NO), the processing proceeds to step S4.

In step S3, as described above, the control unit 23 estimates the condition of dust in the destination area of the UAV 1 on the basis of the sensing data acquired in step S2. For example, both a current dust condition and a future dust condition are estimated by the estimation processing unit 23c. Pieces of information each indicating the estimated dust condition is stored in the storage unit 22 in time series in a manner such that each piece of the information is correlated to: a condition category indicating the current condition or the future condition; and each estimation time.

In step S4, the control unit 23 determines, on the basis of the estimation result in step S3, whether or not to change the flight route of the UAV 1 currently flying along the predetermined flight route. For example, in a case where the current dust condition (that is, the dust condition in the destination area located on the flight route of the UAV 1) estimated in step S3 is a first reference level or higher, the control unit 23 determines to change the flight route of the UAV 1 (step S4: YES), and the processing proceeds to step S5.

Incidentally, whether or not to change the flight route of the UAV 1 may be determined on the basis of results of estimation performed a plurality of times in time series. For example, in a case where an average value (or a maximum value) of the plurality of times of dust conditions (including a most recent dust condition) estimated until a past timepoint is the first reference level or higher, the flight route of the UAV 1 is determined to be changed, and this past timepoint is obtained by tracing back a past predetermined period (e.g., 5 minutes) from estimation time correlated to the most recent dust condition stored in the storage unit 22.

On the other hand, in a case where the current dust condition estimated in step S3 is less than the first reference level, the control unit 23 determines not to change the flight route of the UAV 1 (step S4: NO), and the processing returns to step S1. Incidentally, in a case where the dust condition is not yet estimated at the time of determination in step S4, the processing returns to step S1.

In step S5, the control unit 23 resets, on the basis of the estimation result in step S3, a flight route that passes through airspace where the current dust condition is less than the first reference level. For example, a flight route that bypasses airspace having heavy dust or a flight route of flying at an altitude having light dust is reset. Next, the control unit 23 transmits, to the UAV 1, a control command to change the current flight route of the UAV 1 to the flight route reset in step S5 (step S6), and the processing returns to step S1. The control command may also be transmitted to the UAV 1 via the GCS.

Then, the UAV 1 changes the current flight route to the reset flight route in accordance with the control command from the control server CS in step S6, and continues the flight toward the destination point along the changed flight route.

The steps S2 to S6 above are repeated until it is determined that the UAV 1 has arrived at the destination point. Then, in a case where the control unit 23 determines that the UAV 1 has arrived at the destination point (step S1: YES), the processing proceeds to step S7.

In step S7, the control unit 23 determines, on the basis of the estimation result in step S3, whether or not to drop the water that suppresses the dust at the destination point in the destination area of the UAV 1. For example, in a case where the future dust condition estimated in step S3 (for example, in a case where a most recent future dust condition stored in the storage unit 22) is a second reference level or higher, the control unit 23 determines to drop the water that suppresses the dust (step S7: YES), and the processing proceeds to step S8.

Incidentally, the second reference level may be different from the first reference level. Moreover, whether or not to drop the water that suppresses the dust may be determined on the basis of the results of estimation performed the plurality of times in time series, in a manner similar to the case of determining whether or not to change the flight route of the UAV 1. Moreover, the processing of step S7 may be performed after processing of step S9.

On the other hand, in a case where the future dust condition estimated in step S3 is less than the second reference level, the control unit 23 determines not to drop the water that suppresses the dust (step S7: NO), and the processing proceeds to step S9.

In step S8, the control unit 23 transmits, to the UAV 1, a control command to drop the water that suppresses the dust, and the processing proceeds to step S9. The control command may also be transmitted to the UAV 1 via the GCS.

Then, the UAV 1 drops the water that suppresses the dust from the sky above the destination point in accordance with the control command from the control server CS in step S8 by the water sprinkling control. Consequently, sand accumulated on the ground can be prevented from becoming airborne as sand dust due to the propulsive force generated by the UAV 1 (that is, the wind generated by the propulsive force).

In step S9, the control unit 23 designates (selects) one article transfer method from among the plurality of article transfer methods on the basis of the estimation result in step S3. For example, in a case where the future dust condition estimated in step S3 is a third reference level or higher, the control unit 23 designates the article transfer method of making the UAV 1 lower the article with the reel or the like in the hovering state (the (iv) article transfer method described above). On the other hand, in a case where the future dust condition estimated in step S3 is less than the third reference level, the article transfer method of making the UAV 1 land (the (vi) article transfer method described above) is designated.

Incidentally, the third reference level may be different from the first reference level and the second reference level. Moreover, the selection of the article transfer method may also be determined on the basis of the results of estimation performed the plurality of times in time series, in a manner similar to the case of determining whether or not to change the flight route of the UAV 1.

Next, the control unit 23 transmits, to the UAV 1, a control command to select the article transfer method designated in step S9 (step S10), and ends the processing illustrated in FIG. 7. The control command may also be transmitted to the UAV 1 via the GCS.

Then, the UAV 1 selects one article transfer method in accordance with the control command from the control server CS in step S10, and performs the article transfer control by the selected article transfer method. For example, the UAV 1 lowers the article with the reel in the hovering state, and releases the article when the article reaches the ground or when the article reaches a height of several meters from the ground. Consequently, the sand accumulated on the ground due to the propulsive force generated by UAV 1 can be prevented from becoming airborne as the sand dust.

Incidentally, in step S9 described above, the article transfer method is designated, but a landing method of the UAV 1 may be designated instead thereof. In this case, the control unit 23 designates (selects) one landing method from among the plurality of landing methods on the basis of the estimation result in step S3. For example, in the case where the future dust condition estimated in step S3 is the third reference level or higher, the control unit 23 designates the landing method of landing by stopping the rotor driving and opening the parachute (the (ii) landing method described above). On the other hand, in the case where the future dust condition estimated in step S3 is less than the third reference level, the landing method of making the UAV 1 gradually descend and land by the rotor drive control (the (i) landing method described above) is designated.

Next, the control unit 23 transmits, to the UAV 1, a control command to select the landing method designated in step S9. Then, the UAV 1 selects one landing method in accordance with the control command from the control server CS, and performs the landing control by the selected landing method. For example, the UAV 1 lands by stopping the rotor driving and opening the parachute. Consequently, the sand accumulated on the ground can be prevented from becoming airborne as the sand dust due to the propulsive force generated by the UAV 1 (that is, the wind generated by the propulsive force).

As described above, according to the above-described embodiment, the sensing data obtained by observing the destination area with the sensor from the flight position of the UAV 1 is acquired, and the condition of dust in the destination area is estimated on the basis of the sensing data, and therefore, the condition of dust can be estimated before the UAV 1 is affected by the dust. Then, since the UAV 1 is controlled on the basis of such an estimation result, it is possible to make the UAV 1 be hardly affected by the dust during the flight. Furthermore, according to the above-described embodiment, since a condition of dust that may become airborne in the future can be estimated on the basis of the condition of at least one of the dust and the sand accumulated on the ground in the observed destination area, it is possible to accurately estimate the condition of dust that may be caused by the propulsive force generated by a UAV 1.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in the above-described embodiment, the control server CS estimates a condition of dust in a destination area on the basis of sensing data, but instead, the UAV 1 or the GCS may estimate the condition of dust in the destination area on the basis of the sensing data and may control the UAV 1 on the basis of the estimation result.

Moreover, in the above-described embodiment, the description is provided by exemplifying a UAV as an aerial vehicle capable of flying unmanned, but the present invention is also applicable to a manned aerial vehicle capable of flying without an operator (pilot) inside the aerial vehicle. A person other than an operator (for example, a passenger) may board this manned aerial vehicle.

REFERENCE SIGNS LIST

1 UAV
2 UTMS
3 PMS
CS Control server
11 Drive unit
12 Positioning unit
13 Radio communication unit
14 Imaging unit
15 Control unit
21 Communication unit
22 Storage unit
23 Control unit
23a Flight route setting unit
23b Sensing data acquisition unit
23c Estimation processing unit
23d Water sprinkling determination unit
23e Aircraft control unit
S Flight system

The invention claimed is:

1. A processing system including an aerial vehicle that includes a sensor and is capable of flying unmanned, the processing system comprising:
at least one memory configured to store program code; and at least one processor configured to access the program code and operate as instructed by the program code, the program code including:
acquisition code configured to cause the at least one processor to acquire sensing data obtained by observing, with the sensor, an area of a scheduled destination of the aerial vehicle from a flight position of the aerial vehicle;
processing code configured to cause the at least one processor to estimate, on the basis of the sensing data, a condition of dust in the area of the scheduled destination, wherein the processing code is configured to estimate the condition of the dust by:
predicting a future dust condition potentially caused by a propulsive force of the aerial vehicle at a future time of landing at the scheduled destination by: i) obtaining image data of the scheduled destination using a camera, ii) determining a color strength from the image data, iii) determining a current dust condition from the color strength, and iv) determining a mass of the future dust condition based on the current dust condition, resetting, in response to the future dust condition, a first flight route to a second flight route, wherein the second flight route is to a second destination different from the scheduled destination, wherein the second destination is determined to not be affected by the future dust condition; and control code configured to cause the at least one processor to control the aerial vehicle to proceed on the second flight route to the second destination.

2. The processing system according to claim 1, the program code further including determination code configured to cause the at least one processor to determine, on the basis of an estimation result by the processing code, whether or not to drop liquid that suppresses the dust in the area of the scheduled destination.

3. The processing system according to claim 1, wherein the aerial vehicle transports an article to be transferred in the area of the scheduled destination, and the program code further includes first selection code configured to cause the at least one processor to select, on the basis of an estimation result by the processing code, any one article transfer method from among a plurality of different article transfer methods.

4. The processing system according to claim 3, wherein the first selection code causes the at least one processor to select an article transfer method of making the aerial vehicle lower the article while making the aircraft hover for transferring the article.

5. The processing system according to claim 3, wherein the first selection code causes the at least one processor to select an article transfer method of making the aerial vehicle land for transferring the article.

6. The processing system according to claim 1, wherein the aerial vehicle lands on the area of the second destination, and the program code further includes second selection code configured to cause the at least one processor to select, on the basis of an estimation result by the processing code, any one landing method from among a plurality of different landing methods.

7. The processing system according to claim 1, wherein the processing code causes the at least one processor to estimate, on the basis of sensing data obtained by observing a ground in the area of the scheduled destination, the future dust condition in the area of the scheduled destination.

8. The processing system according to claim 7, wherein the processing code causes the at least one processor to estimate, on the basis of a condition of at least one of dust and sand accumulated on the ground, the future dust condition corresponding to dust that may become airborne in the future.

9. The processing system of claim 1, wherein the processing code is further configured to determine the current dust condition by inputting a camera image of the scheduled destination to a trained model.

10. An aerial vehicle capable of flying unmanned, comprising:
a sensor;
an acquisition unit configured to acquire sensing data obtained by observing, with the sensor, an area of a scheduled destination of the aerial vehicle from a flight position of the aerial vehicle; and
a processing unit configured to estimates, on the basis of the sensing data, a condition of dust in the area of the scheduled destination, wherein the processing unit is further configured to estimate the condition of the dust by:
predicting a future dust condition potentially caused by a propulsive force of the aerial vehicle at a future time of landing at the scheduled destination by: i) obtaining image data of the scheduled destination using a camera, ii) determining a color strength from the image data, and iii) determining a current dust condition from the color strength, and iv) determining a mass of the future dust condition based on the current dust condition, resetting, in response to the future dust condition, a first flight route to a second flight route, wherein the second flight route is to a second destination different from the scheduled destination, wherein the second destination is determined to not be affected by the future dust condition; and
control code configured to cause the at least one processor to control the aerial vehicle to proceed on the second flight route to the second destination.

11. A dust condition estimation method performed by a processing system comprising an aerial vehicle that includes a sensor and is capable of flying unmanned, the dust condition estimation method including:
acquiring sensing data obtained by observing, with the sensor, an area of a scheduled destination of the aerial vehicle from a flight position of the aerial vehicle; and
estimating, on the basis of the sensing data, a condition of dust in the area of the scheduled destination, wherein the estimating comprises predicting a future dust condition potentially caused by a propulsive force of the aerial vehicle at a future time of landing at the scheduled destination by: i) obtaining image data of the scheduled destination using a camera, ii) determining a color strength from the image data, and iii) determining a current dust condition from the color strength, and iv) determining a mass of the future dust condition based on the current dust condition;
resetting, in response to the future dust condition, a first flight route to a second flight route, wherein the second flight route is to a second destination different from the scheduled destination, wherein the second destination is determined to not be affected by the future dust condition; and
controlling the aerial vehicle to proceed on the second flight route to the second destination.

* * * * *